(No Model.) 2 Sheets—Sheet 1.
H. B. NICHOLS & F. H. LINCOLN.
UNDERGROUND ELECTRIC RAILWAY.
No. 529,406. Patented Nov. 20, 1894.
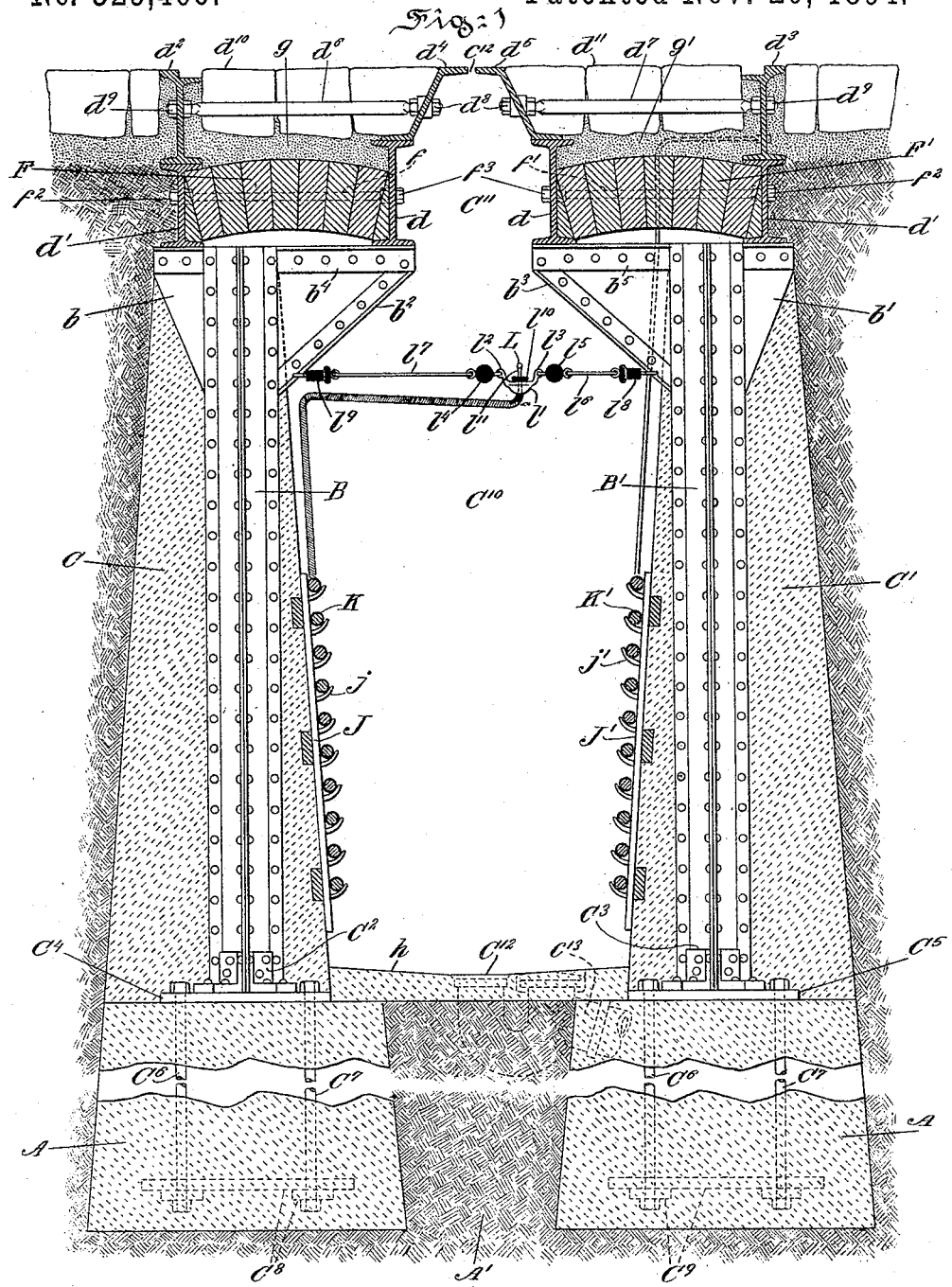
Witnesses:
Richard C. Maxwell.
Louis Winterberger.
Inventors.
Henry B. Nichols and Frederick H. Lincoln.
By J. Walter Douglass
Attorney.

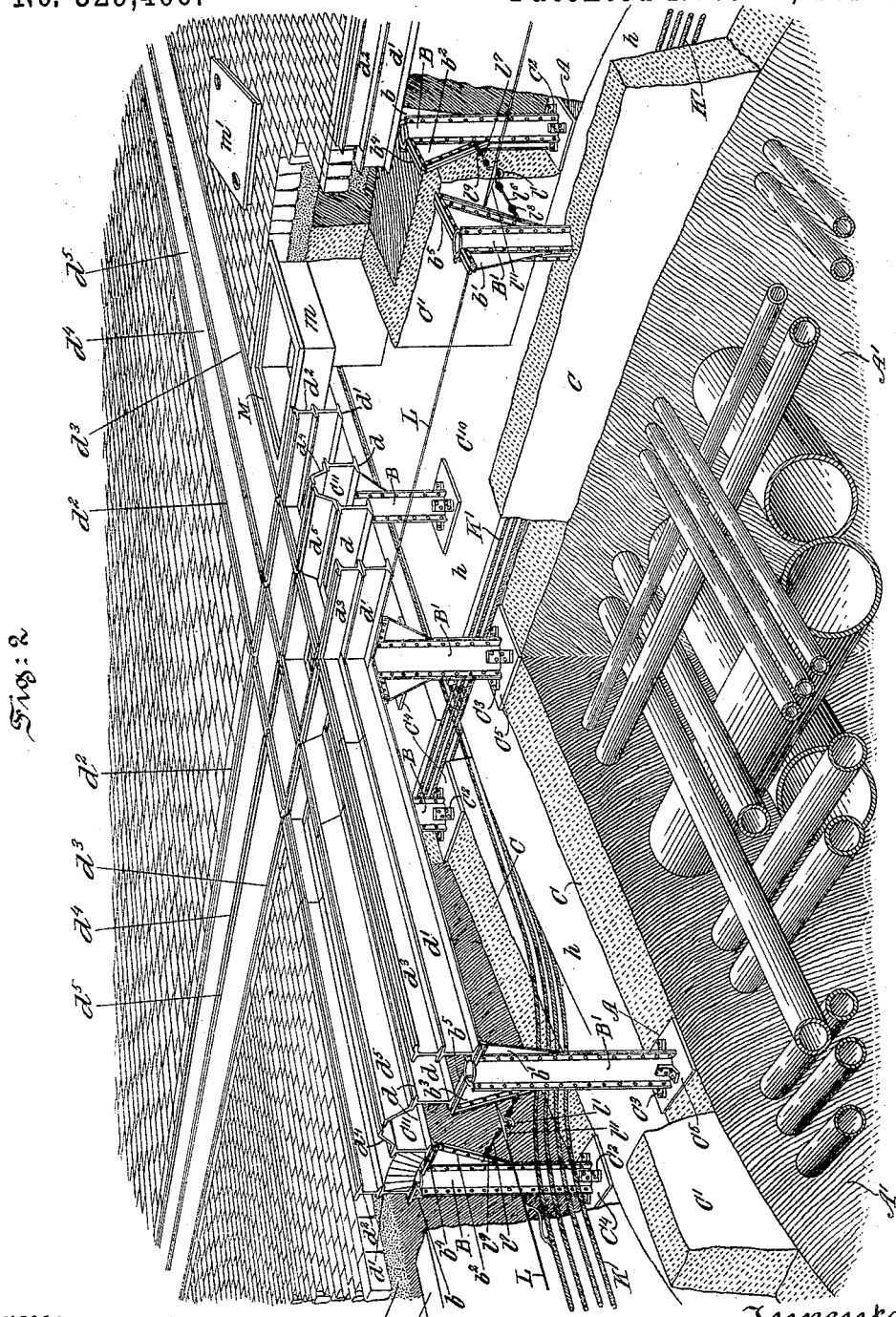

UNITED STATES PATENT OFFICE.

HENRY B. NICHOLS AND FREDERICK H. LINCOLN, OF PHILADELPHIA, PENNSYLVANIA.

UNDERGROUND ELECTRIC RAILWAY.

SPECIFICATION forming part of Letters Patent No. 529,406, dated November 20, 1894.

Application filed June 13, 1894. Serial No. 514,373. (No model.)

*To all whom it may concern:*

Be it known that we, HENRY B. NICHOLS and FREDERICK H. LINCOLN, both citizens of the United States, residing at the city of Philadelphia, in the county of Philadelphia and State of Pennsylvania, have invented certain new and useful Improvements in Underground Electric Railways, of which the following is a specification.

Our invention relates to an underground structure or conduit adapted for the reception and support of supply or feeder wires and main conductors of an electric railway; and it relates also to the conductors and wires and arrangement of the same in such a structure or conduit.

The principal objects of our present invention are, first, to provide a comparatively inexpensive, substantial and durable underground structure to constitute a conduit for the reception of the supply or feeder wires and main conductors of an electric railway; second, to provide an underground electric trolley system, in which the main conductor at suitable distances apart is connected with insulated hangers supported by guys or the like having swivel-connections with struts or spans thereof; third, to provide an underground structure comprising metal columns having I-beams supported thereon and tied to each other through arched brick-work or masonry by means of tie-rods or the like and the track rails supported to said beams, as well as Z or similar shaped bars or frames to constitute complemental portions reversely arranged with respect to each other of the conduit, and connected with the track rails by means of tie-rods respectively bolted thereto in such manner as to provide the necessary slot for the introduction of the arm of a trolley, brush or sled for contact with a main conductor supported in the conduit, whereby is provided a substantial and effective underground electric railway in which electric leakage is reduced to a minimum and a good working current insured for electrically propelling vehicles by means thereof, and, fourth, to provide an underground structure set into a foundation composed of concrete, cement or other suitable material and comprising Phœnix columns or the like tied or braced to position in said material and the structure arranged so as to incline slightly from the top thereof to near the bottom having at suitable distances apart therein traps for conveying water and other matter therefrom into a sewer, and the structure supporting a road-bed about which are arranged I-bars or beams and Z-bars or frames to form an upper contracted conduit with a slot formed between said bars or frames for the introduction therethrough of the arm of a trolley, sled or brush of a car or other vehicle adapted to be brought into contact with a main conductor supported from guys or the like and connected with struts extending from the columns or standards of the lower chamber of the structure.

Our invention stated in general terms consists of an underground electric railway constructed and arranged in substantially the manner hereinafter described and claimed.

The nature and scope of our invention will be more fully understood from the following description taken in connection with the accompanying drawings forming part hereof, and in which—

Figure 1, is a vertical central section through an underground structure, showing in elevation means for supporting the main conductor in said structure and embodying features of our invention; and Fig. 2, is a perspective view, showing two cross streets provided with underground structures with the supply or feeder wires and main conductors therein and embodying characteristic features of our invention.

Referring to the drawings, A represents the foundation composed of concrete or other suitable material set into earth, clay or the like A'.

B and B', are hollow flanged metal columns in sections bolted together and set into walls of concrete material, masonry or the like C and C'. These columns at the bottom are secured by means of angle irons $C^2$ and $C^3$, to base plates $C^4$ and $C^5$, having tie-rods $C^6$ and $C^7$, extending through and engaging with plates $C^8$ and $C^9$, set into the concrete or masonry A, as illustrated in Fig. 1. These columns B and B', at the upper extremities thereof are provided with brackets $b$ and $b'$, and with struts $b^2$ and $b^3$.

$b^4$ and $b^5$, are cross-beams suitably bolted or otherwise secured to said columns, brackets and struts.

$d$ and $d'$, are longitudinal I-beams supported on the cross-beams $b^4$ and $b^5$.

$d^2$ and $d^3$, are track-rails supported on the I-beams $d'$, on each side or end of the structure and $d^4$ and $d^5$, are Z-bars, frames or plates supported to position on the I-beams $d$. These track-rails and Z-bars or frames are held to position on the respective beams $d$ and $d'$, by means of tie-rods $d^6$ and $d^7$, the extremities of which are threaded and engaged by nuts $d^8$ and $d^9$, whereby said track-rails and Z-bars are firmly held to position with masonry $d^{10}$ and $d^{11}$, or the like between them, as clearly illustrated in Fig. 1.

Between the I-beams $d$ and $d'$, on each side of the structure are interposed tapering blocks, bricks or the like arranged to form arched structures F and F', as clearly shown in section in Fig. 1, and tied together by means of tie-rods $f$ and $f'$, having threaded ends engaged by nuts $f^2$ and $f^3$. Between the respective rails and I-beams are interposed layers or strata of concrete $g$ and $g'$.

$C^{10}$, is the main chamber of the underground structure and $C^{11}$, is the upper contracted and slotted chamber of said structure, as will be seen from Fig. 1, of the drawings.

In the bottom of the structure is provided a floor of concrete $h$, inclining from the columns B and B', in the direction of the center and in this floor of the main chamber $C^{10}$, at suitable distances apart are provided U- or similar shaped traps $C^{12}$, for receiving the surface water or other fluid matter deposited through the slot $c^{12}$, of the upper contracted chamber $C^{11}$, into the chamber $C^{10}$, which is conveyed to the traps $C^{12}$, and through the outlets $c^{13}$, thereof into the sewer or other source of discharge. Not shown.

It may be here remarked that the structure of our invention as fully illustrated in Fig. 2, is such as not to interfere with the ordinary arrangement of gas, water and sewer pipes as usually found underground. The arrangement of the traps $C^{12}$, in the floor of the chamber $C^{10}$, is such as that connection may be readily made with sewer pipes for conveying away the surface or drainage water accumulating in the conduit or sub-way, of our invention. Along the respective sides of the conduit are provided insulated shelves or racks J and J', having catches or hooks $j$ and $j'$. These shelves or racks of insulating material are secured in the concrete or cement walls C and C', of the structure, or may be attached to the vertical columns or standards B and B'. The hooks $j$ and $j'$, of the racks are preferably arranged in tiers, and engaging therewith are insulated electric feeder or supply wires K and K', which are adapted to be connected at suitable distances apart with the main conductor L, or guys connected with said conductor, to maintain the strength of the electric current normal throughout the length of the same in the sub-way, structure or conduit.

The main conductor L, is supported at suitable distances apart in U or other shape insulated hangers $l'$, provided at the extremities thereof with eyes $l^2$ and $l^3$, with which engage globe-strain insulating devices $l^4$ and $l^5$, and to which are attached insulated wire guys $l^6$ and $l^7$, provided with insulated swivel connections $l^8$ and $l^9$, which are attached to the struts $b^2$ and $b^3$, of the columns B and B'. Each of the U-shaped hangers $l'$, is provided with a recess or cup $l^{10}$, in which is inserted a T-arm $l^{11}$, as shown in Fig. 2, forming a bridge. This T-arm $l^{11}$, it should be understood, is insulated from the cup $l^{10}$, of said hanger $l'$, in any preferred manner. It may be here remarked that the main conductor L, as clearly shown in Fig. 2, is connected with the upper portion of each of said T-arms or bridges. The said guys, swivel connections and globe-straining devices connected with the hangers $l'$, may be each covered with insulating material, in order to prevent electric leakage or short circuiting, or loss of the current in feeding the line conductor; and moreover, the supply or feeder wires K and K', may be connected therewith at suitable distances apart in the length of the line or main conductor for maintaining the current therethrough normal throughout the length thereof.

It may be here remarked that the arrangement of the main conductor in the underground structure is such as to insure the maintenance of a high standard of insulation as well as the avoidance of condensation in, about or around the conductor, which is due to its location out of alignment with the slot in the top of the conduit, whereby most desirable results and efficient actions of the conductor are secured in the practice of our invention.

Alongside the track-rails at suitable distances apart are formed rectangular shaped openings or man-holes M, provided with boxes $m$, with flanged tops for engaging said openings and with removable caps or covers $m'$, for permitting of access being had therethrough to the interior of the structure for making repairs to the lines or conductors, as well as for other purposes.

In use, an arm carrying a trolley from a car is inserted through the slot $c^{12}$, between the Z-bars or frames $d^4$ and $d^5$, so as to engage the main conductor L, which is located somewhat to the right of the slot $c^{12}$, in the chamber $C^{10}$, as clearly shown in Fig. 1, in order that any fluid or liquid falling through the slot of the chamber $C^{11}$, may escape the main conductor L, and be conveyed onto the floor $h$, of the chamber $C^{10}$, and conducted therefrom through the traps $C^{12}$, into the sewer. By contact of the trolley with the main conductor L, the current will be communicated therefrom to the motor of the car, not shown, in a well understood manner for propelling the same and may be stopped by cutting off the current from the motor of the car through a switch connected therewith and adapted for such purpose.

Having thus described the nature and objects of our invention, what we claim as new, and desire to secure by Letters Patent, is—

1. An underground structure, comprising columns having brackets and struts, cross-beams mounted thereon, I-beams mounted on said cross-beams and supporting track-rails to position and inclined Z-bars or frames bound together by tie-rods, the construction being such that two chambers of different diameters are formed, whereof one is provided with a slot and the other with a conductor arranged out of alignment with said slot, supported by hangers suspended from insulated cross-guys attached to said structure, substantially as described.

2. An underground structure, comprising columns supporting a road-bed, track-rails and frames, the latter reversely arranged to constitute a slotted contracted chamber communicating with an enlarged lower chamber, racks supporting supply or feeder wires and an electric conductor in said lower chamber supported by insulated cross guys to said structure out of alignment with the slot of said contracted chamber, substantially as described.

In testimony whereof we have hereunto set our signatures in the presence of two subscribing witnesses.

HENRY B. NICHOLS.
FREDERICK H. LINCOLN.

Witnesses:
RICHARD C. MAXWELL,
THOMAS M. SMITH.